United States Patent [19]

Tanaka et al.

[11] Patent Number: 4,742,256
[45] Date of Patent: May 3, 1988

[54] SCREW-TIGHTENED STRUCTURE FOR SYNTHETIC RESIN MEMBER

[75] Inventors: Shinsaku Tanaka, Tokyo; Tadao Arata, Inagi, both of Japan

[73] Assignee: Tanashin Denki Co., Ltd., Tokyo, Japan

[21] Appl. No.: 927,935

[22] Filed: Nov. 7, 1986

[30] Foreign Application Priority Data

Jul. 30, 1986 [JP] Japan .................. 61-117140[U]

[51] Int. Cl.$^4$ .................................................. H02K 15/14
[52] U.S. Cl. .................................... 310/51; 29/526 R; 188/380; 267/160; 310/91; 360/106; 411/544
[58] Field of Search ............ 29/526 R; 188/166, 380; 267/140.4, 158, 160, 164; 310/51, 89, 91, 43; 360/106, 107; 411/531, 544, 545

[56] References Cited

U.S. PATENT DOCUMENTS

| | | | |
|---|---|---|---|
| 2,515,799 | 7/1950 | Rouy | 310/51 |
| 3,344,397 | 9/1967 | Elliott et al. | 267/160 |
| 3,536,315 | 10/1970 | Jenkin | 267/160 |
| 3,572,112 | 3/1971 | Igoe | 188/380 |
| 3,743,268 | 7/1973 | Heiland et al. | 267/160 |
| 3,884,457 | 5/1975 | Leko | 411/544 |
| 4,389,688 | 6/1983 | Higashiyama | 360/107 |
| 4,498,825 | 2/1985 | Pamer et al. | 411/544 |
| 4,520,987 | 6/1985 | Eguchi et al. | 310/91 |
| 4,687,960 | 8/1987 | Frister | 310/51 |

FOREIGN PATENT DOCUMENTS 434426 9/1935 United Kingdom .

OTHER PUBLICATIONS

U.K. Search Report.

Primary Examiner—Patrick R. Salce
Assistant Examiner—D. L. Rebsch
Attorney, Agent, or Firm—Wegner & Bretschneider

[57] ABSTRACT

In order to mount a body on a base by way of a synthetic resin member, a structure is useful in tightening and fixing the synthetic resin member on the body by means of a screw which can be tightened only to a limited degree, so as to avoid its tightening to the screw head thereof. A planar portion with a screw insertion hole formed therethrough is provided at the screwed part of the synthetic resin member. At least one first land to be brought into contact with the screw head and at least one second land to be brought into contact with the body are provided respectively on both surfaces of the planar portion at different locations as seen in a plan view of the planar portion. An interference which is to occur upon tightening the screw is absorbed through an elastic deformation of the planar portion.

8 Claims, 4 Drawing Sheets

SCREW-TIGHTENED STRUCTURE FOR SYNTHETIC RESIN MEMBER

BACKGROUND OF THE INVENTION

1. Field of the Invention

This invention relates to a screw-fastened structure for a synthetic resin member, which structure is adapted to fasten and fix the synthetic resin member on a body by means of a screw. The body is in turn mounted on a base via the synthetic resin member.

2. Description of the Prior Art

A tape recorder, especially, a cassette tape recorder is constructed basically as shown in FIG. 8. Namely, a winding reel shaft 2, a rewinding reel shaft 3 and a capstan 4 are provided on a base plate. A pinch roller 5 is provided pivotally relative to the capstan 4. On a head frame 7, a magnetic head 6 is mounted movably in a direction indicated by the arrows.

Further, a motor 8 adapted to drive and rotate the winding and rewinding reel shafts 2,3 and capstan 4 is also mounted on the base plate 1 by way of a motor mount 9 made of a synthetic resin or the like. Incidentally, numeral 10 indicates a tape cassette to be loaded on the tape recorder.

The motor 8 rotates, usually, while producing rotational vibrations. If these vibrations are transmitted to the base plate 1, variations will take place with respect to the state of sliding contact between the magnetic head 6 and a magnetic tape and the feeding speed of the magnetic tape fed by the capstan 4 and pinch roller 5. These variations will lead to reduced recording and playback characteristics of the tape recorder, for example, lowered sound quality.

With the foregoing in view, there has conventionally been adopted such an improvement as shown in FIG. 9 in the fixing of the mount 9 (synthetic resin member) and motor 8 (body to be mounted) so as to avoid transmission of vibrations of the motor 8 to the base plate 1. In an example shown in FIG. 9(a), rubber bushes 11 are attached to the mount 9 and the motor 8 is fixed on the mount 8 by way of the rubber bushes 11. Namely, the rubber bushes 11 are fit in respective insertion holes 12 for motor-fixing screws 13. The screws 13 are caused to extend through central holes of the corresponding bushes 11 and to threadedly engage their corresponding internally-threaded bores (not shown) formed in the upper wall of the motor 8, whereby the mount 9 is held via the bushes 11 between the screw heads of the screws 13 and the upper wall of the motor 8. In this structure, vibrations are absorbed owing to elastic deformations of the rubber bushes 11, so that the transmission of vibrations from the motor to the base plate 1 is suppressed. Turning next to another example illustrated in FIG. 9(b), the mount 9 is formed thinner at areas 9a adjacent to the respective screw insertion holes so that vibrations from the motor 8 are absorbed through elastic deformations of the mount itself.

The above conventional structures are however accompanied by the following problems. In the structure of FIG. 9(a), the elasticity of each rubber bush 11 varies depending on the degree of tightening of its corresponding screw 13. It is hence difficult to draw fully the effects of the rubber bushes 11, which suppress transmission of vibrations by making use of their own elasticity. It is also required to fit the rubber bushes 11 in the mount 9, leading to such inconvenience that their assembly work is cumbersome and moreover, the manufacturing cost is high due to the need for an increased number of components.

On the other hand, the structure depicted in FIG. 9(b) permits easy fixing between the mount 9 and motor 8 by simply tightening the screws without need for any extra parts such as rubber bushes. Even if the screws 13 are tightened firmly, a gap 14 may occur between the screws 13 and mount 9 due to variations in temperature. The formation of the gap 14 results in such problems that the screws 13 are loosened and in some worst cases, fall off due to rotational vibrations of the motor 8.

SUMMARY OF THE INVENTION

With the foregoing in view, the present invention has as its principal object the provision of a screw-fastened structure for a synthetic resin member, which structure allows fixing the synthetic resin member surely on a body by tightening a screw, without need for rubber bushes or the like, and at the same time can avoid loosening of the screw.

The present inventors have found that the above object can be achieved by making use of elastic deformations of the synthetic resin member.

In one aspect of this invention, there is thus provided a screw-fastened structure for a synthetic resin member. The structure is adapted to tighten and fix the synthetic resin member on a body, which is to be mounted via the synthetic resin member on a base, by means of a screw which can be tightened only to a limited degree, so as to avoid its tightening to the screw head thereof. A planar portion with a screw insertion hole formed therethrough is provided at the screwed part of the synthetic resin member. At least one first land to be brought into contact with the screw head and at least one second land to be brought into contact with the body to be mounted are provided respectively on both surfaces of the planar portion at different locations as seen in a plan view of the planar portion. An interference which is to occur upon tightening the screw is to be absorbed through an elastic deformation of the planar portion.

Since the above construction allows to absorb an interference, which is to occur upon tightening the screw, through an elastic deformation of the planar portion of the synthetic resin member, it is possible to avoid the formation of a gap between the synthetic resin member and the screw even if the temperature varies. It is accordingly possible to prevent the screw from loosening.

BRIEF DESCRIPTION OF THE DRAWINGS

The above and other objects, features and advantages of the present invention will become apparent from the following description and the appended claims, taken in conjunction with the accompanying drawings, in which:

FIG. 1 through FIG. 5 show one embodiment of this invention applied to a vibration control device of a tape recorder, namely, FIG. 1 is an exploded perspective view showing the construction of a motor mount;

FIG. 2 is a plan view showing the shape of the motor mount;

FIG. 5 is a partly cross-sectional view showing a structure securing a motor on a mount;

DETAILED DESCRIPTION OF THE INVENTION AND PREFERRED EMBODIMENTS

Figure 1:
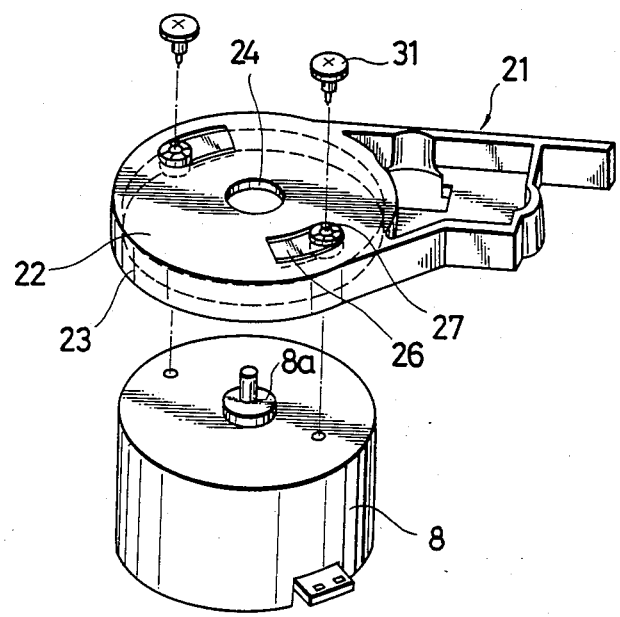
Figure 2:
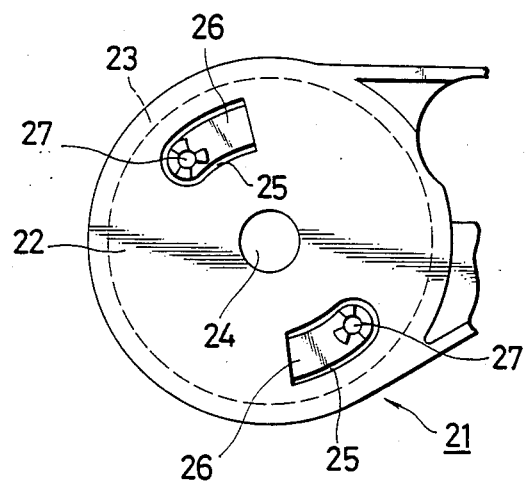

Referring first to FIG. 1, a motor mount 21 which is secured to a base plate of a tape recorder is composed of a member formed integrally with a synthetic resin. As shown in plan in FIG. 2, the mount 21 has on the lower surface of a main part 22 thereof an annular flange 23 which externally fits on an upper circumferential part of a motor 8. Through the center of a recess defined in the main part 22 by the flange 23, there is formed an insertion hole 24 through which a drive shaft 8a of the motor 8 extends.

U-shaped slits 25,25 (see, FIG. 2) are formed along the periphery of the main part 22 of the motor mount 21 through a major part of the main part 22 at positions point-symmetrical relative to the insertion hole 24, thereby forming tongues (planar portions) 26. A plurality of tongues 26 (two tongues in the illustrated embodiment) cut off partly from the main part 22 by their corresponding U-shaped slots 25 but connected at their bases to the main part 22, are hence provided point-symmetrically around the insertion hole 24. The directions of the tongues 26 are all set counterclockwise in the illustrated embodiment, so that they extend in the same direction along the periphery of the main part 22. The thickness of each of these tongues 26 is formed thinner, compared with the thickness of the main part 22 of the motor mount 21, whereby the tongues 26 are allowed to absorb vibrations sufficiently.

Figure 3A:
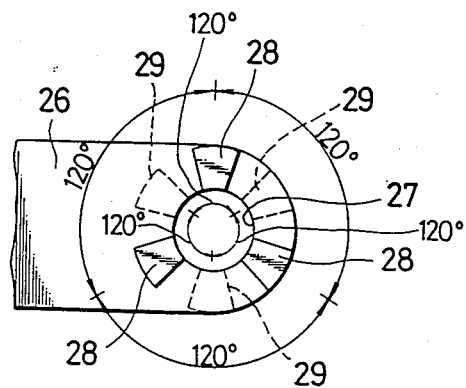
FIGS. 3(a) and 3(b) illustrate the shape of lands formed at a tip portion of a tongue.
Figure 3B:
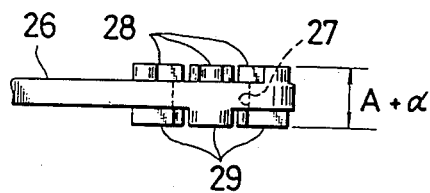

As best seen in FIGS. 3(a) and 3(b) which illustrate the structure of a tip portion of each tongue 26 in detail, a hole 27 (hereinafter called "screw insertion hole", through which a motor-fixing screw is inserted, is formed through the tip portion and lands 28,29 are provided respectively around the hole 27. Namely, the three lands 28 are formed at an equal angular interval on the upper surface of the tip portion of the tongue 26 and the three lands 29 are similarly formed at an equal angular interval on the lower surface of the tip portion. These lands 28,29 are positioned alternately around the screw insertion hole 27 as seen in the plan view of FIG. 3(a).

Figure 4A:
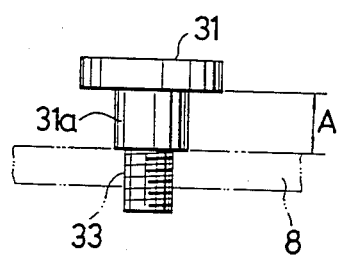
FIG. 4(a) shows a screw having a stem the diameter of which is larger at a base portion thereof proximal to the screw head of the screw.
Figure 4B:
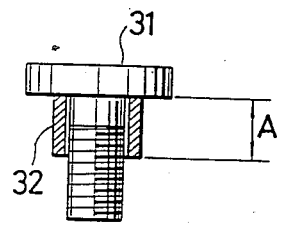
FIG. 4(b) depicts a screw having a sleeve fit on the stem of the screw at a base portion thereof proximal to the screw head thereof.
Figure 5:
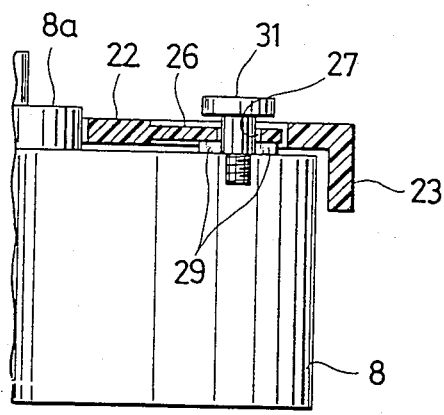

Screws 31 to be inserted through their corresponding screw insertion holes 27 are each limited in the degree of their tightening. Two examples of screws 31 are shown in FIGS. 4(a) and 4(b) respectively. In FIG. 4(a), the stem of the screw 31 has a large-diametered base portion 31a so as to form a stepped structure which permits a limited degree of tightening. In FIG. 4(b), a collar 32 is fit on a base portion of the circumference of the stem of the screw 31 so as to limit the tightening degree of the screw 31. Here, the axial lengths of the large-diametered base portion 31a and the collar 32 which regulate the tightening degrees are both A as shown in FIGS. 4(a) and 4(b), whereas the thickness of the tip portion of the tongue 26 inclusive of the lands 28,29 is A+$\alpha$ as indicated in FIG. 3(b).

The motor 8, which is fit in the recess of the lower surface of the main part 22 of the mount 21 with a narrow annular gap left between the outer periphery of the motor 8 and the flange 23, is secured to the tip portions of the tongues 26 by tightening the screws 31 into holes 33 formed in the upper surface of the motor 8. In other words, the motor 8 is secured to the motor mount 21 by means of the screws 31 which extend through screw insertion holes 27 formed through the tip portions of the tongues 26 and then engage threadedly the motor 8.

Here, the tip portion of each tongue 26 undergoes an elastic deformation by a degree equivalent to $\alpha$ when the corresponding screw 31 is tightened. Since the lands 28,29 are alternately arranged on the upper and lower surfaces of the tip portion respectively, the tip portion of the tongue 26 undergoes a wavy elastic deformation upon tightening the screw 31 so that an interference caused by the screw 31 is absorbed through this elastic deformation. Since the tightening degree of the screw 31 is limited, owing to the provision of the large-diametered base portion 31a or collar 32, no matter how much the screw is tightened, the above-described elastic deformation is always at the same degree, i.e., $\alpha$.

The motor 8 is mounted on the motor mount 21 of the above-described structure. The respective tongues 26 which carry the motor 8 at their tip portions support the motor 8 elastically relative to their base portions, integral with the main part 22 of the motor mount 21, owing to the elasticity of the synthetic resin. In other words, the tongues 26 to which the motor 8 is attached support the motor 8 while they themselves exhibit elastic action about their base portions as fulcrums.

Since rotational vibrations of the motor 8 are hence absorbed through elastic deformations of the tongues 26, no substantial vibrations are transmitted to the main part 22 of the motor mount 21. Even if the motor is firmly fixed to the tip portions of the tongues 26, the state of the elastic support of the motor 8 is not changed because the tongues 26 exhibit elasticity between their tip portions and base portions. Coupled with the elastic characteristics of the synthetic resin which forms the motor mount 21, it is possible to mount and support the motor 8 while always assuring stable elastic supporting forces and to prevent transmission of rotational vibrations of the motor 8 to the main part 22 and hence to the base plate of the tape recorder, provided that the lengths of the tongues 26 are suitably predetermined.

According to the above-described structure, it is possible to avoid cumbersome work such as adjustment of the degree of tightening (i.e., the tightening degree of each fixing screw) unlike the conventional mounting structure making use of rubber bushes. The mounting of the motor 8 can be readily achieved by simply tightening the screws 31 firmly on the motor 8. Since the transmission of vibrations can be avoided without failure by simply securing the motor 8 firmly on the tip portions of the tongues 26, it is possible to improve the recording and playback characteristics (e.g., the quality of recorded and reproduced sound) by easily but surely avoiding vibrations of the base plate 1 which would otherwise occur due to rotational vibrations of the motor 8.

Owing to the provision of the lands 28,29 at the tip portion of each of the tongues 26, an interference caused as a result of tightening of the corresponding screw 31 can be successfully absorbed through an elastic deformation of the tip portion between the lands 28,29. Even if a temperature change or the like takes place, no gap is allowed to occur between the head of the screw 31 and the upper surface of the tip portion of its corresponding tongue 26 so that the screw 31 is prevented from loosening. Since the screws 31 can each be tightened only to a limited degree, another merit has also been brought about, in that the above-described interference becomes always constant by simply tightening the screw 31 firmly.

Figure 6A:
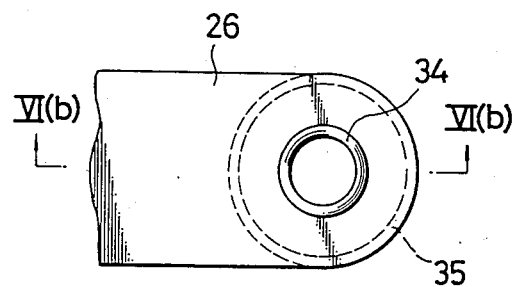
FIG. 6(a) and 6(b) illustrate a modification of the tip portion of the tongue.
Figure 6B:
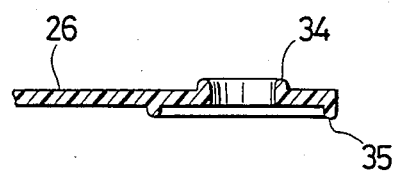
Figure 7A:
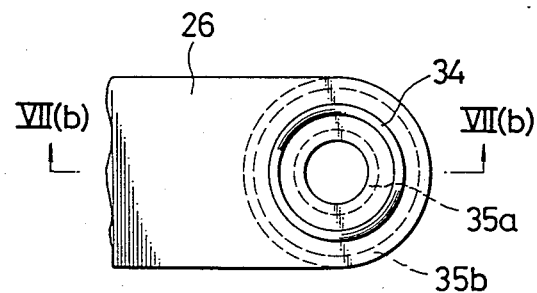
FIGS. 7(a) and 7(b) depict another modification of the tip portion of the tongue.
Figure 7B:
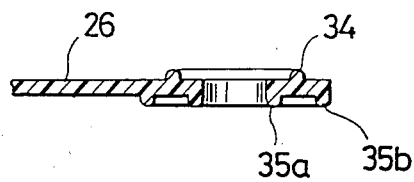
Figure 8:
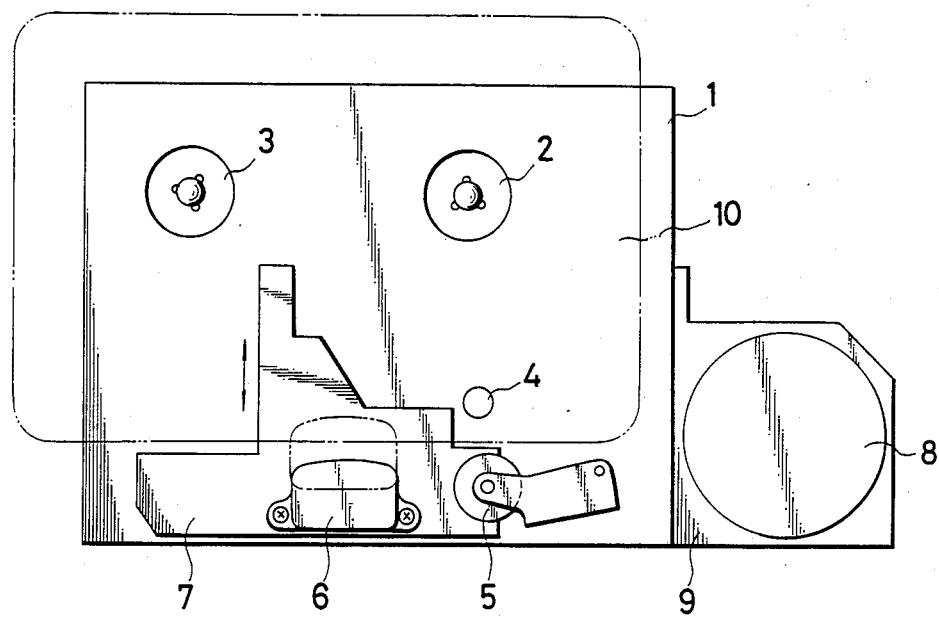
FIG. 8 the basic construction of a tape recorder.
Figure 9A:
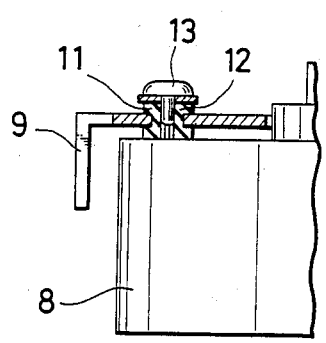
FIG. 9 shows a conventional motor-mounting structure.
Figure 9B:
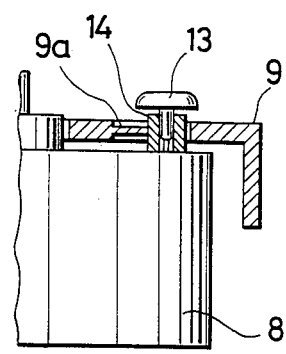

Needless to say, the present invention is not necessarily limited to or by the above-described embodiments. For example, the lands formed on the both surfaces of the tip portion of each tongue (i.e., planar portion) of the motor mount (i.e., the synthetic resin member) are not limited to those formed at an equal interval along the circumference of the tip portion. They may take such a structure as shown in either FIGS. 6(a) and 6(b) or FIGS. 7(a) and 7(b). FIG. 6(a) is a fragmentary plan view of a modification of the tongue while FIG. 6(b) is a cross-sectional view taken along line VI(b)—VI(b) of FIG. 6(a). An annular ridge 34 is provided on the upper surface of the tongue 26 along the circumferential edge of a screw insertion hole 27, while another annular ridge 35 having a diameter greater than the annular ridge 34 is provided on the lower surface of the tongue 26. FIG. 7(a) is a fragmentary plan view of another modification of the tongue while FIG. 7(b) is a cross-sectional view taken along line VII(b)—VII(b) of FIG. 7(a). A annular ridge 35a having the same diameter of the screw insertion hole 27 and another annular ridge 35b having a diameter larger than the annular ridge 35a are both provided on the lower surface of the tongue 26, while a further annular ridge having a diameter between those of the annular ridges 35a, 35b is provided on the upper surface of the tongue 26. These modifications can also bring about substantially the same advantageous effects as the above-described embodiment, because the synthetic resin of each tongue 26 undergoes an elastic deformation between the ridge on the upper surface and the ridge or ridges on the lower surface.

Further, the body to be mounted is not necessarily limited to a motor. The structure of this invention is effective especially to bodies which produce vibrations. The planar portion is not necessarily limited to the above-described tongue. It may take any shape so long as a screw insertion hold is formed therethrough. In addition, the number, shape, arrangement, etc. of lands may be suitably changed depending on given requirements.

Having now fully described the invention, it will be apparent to one of ordinary skill in the art that many changes and modifications can be made thereto without departing from the spirit or scope of the invention as set forth herein.

We claim:

1. A mounting for a motor for attachment to a base of a tape recorder, the mounting being adapted for fastening to the motor by a screw so as to isolate vibrations of the motor from the base, said mounting comprising a through-hole for allowing a drive shaft of the motor to extend therethrough, at least one planar tongue portion defined by a slit in the mounting and provided with a screw insertion hole formed therethrough for attaching the mounting elastically to the motor, at least one first land to be brought into contact with the head of the screw, and at least one second land to be brought into contact with the motor, said first and second lands having different locations on the planar tongue portion as seen in a plan view to provide for distortion of the planar tongue portion upon tightening of the screw.

2. A mounting as claimed in claim 1, wherein a plurality of lands of the same type as the first land and a corresponding number of lands of the same type as the second land are provided with an equal interval around the screw insertion hole and the former and later lands are alternated as seen in a plan view of the planar portion.

3. A mounting as claimed in claim 2, wherein the first and second lands are arranged on an imaginary circle concentric with the screw insertion hole.

4. A mounting as claimed in claim 1, wherein the first and second lands are formed as rings which are of different radii and concentric with the screw insertion hole.

5. A mounting as claimed in claim 1, wherein the stem of the screw has a greater diameter at a base portion thereof which is proximal to the screw head thereof.

6. A mounting as claimed in claim 1, wherein a sleeve is fitted on the stem of the screw at a base portion thereof which is proximal to the screw head thereof.

7. A mounting as claimed in claim 1, wherein the slit is substantially U-shaped.

8. A mounting as claimed in claim 7, wherein the mounting defines a plurality of planar tongue portions distributed with equal angular intervals around the through-hole and the planar tongue portions extend in the same angular direction.

* * * * *